United States Patent [19]

Alboainin

[11] Patent Number: 4,612,724
[45] Date of Patent: Sep. 23, 1986

[54] RODENT CONTROL APPARATUS

[76] Inventor: Ali H. A. Alboainin, 129 Knapps Hwy., Fairfield, Conn. 06430

[21] Appl. No.: 750,334

[22] Filed: Jun. 28, 1985

[30] Foreign Application Priority Data

Jul. 8, 1984 [EG] Egypt .................................. 427-1984

[51] Int. Cl.⁴ .......................................... A01M 27/00
[52] U.S. Cl. ............................................ 43/73; 43/79
[58] Field of Search ................... 43/79, 77, 73, 64, 80

[56] References Cited

U.S. PATENT DOCUMENTS

| | | | |
|---|---|---|---|
| 2,531,568 | 11/1950 | Helme | 43/79 |
| 4,541,199 | 9/1985 | Reidinger | 43/131 |

FOREIGN PATENT DOCUMENTS

| | | |
|---|---|---|
| 347385 | 4/1931 | United Kingdom . |
| 520067 | 4/1940 | United Kingdom . |
| 1274610 | 5/1972 | United Kingdom . |

*Primary Examiner*—Nicholas P. Godici
*Assistant Examiner*—Christopher L. McKee
*Attorney, Agent, or Firm*—Kramer and Brufsky

[57] ABSTRACT

Rodent control apparatus comprises an injection chamber having an injector for shooting a lethal spear into a rodent. The injector is actuated when the rodent's body breaks two parallel beams of energy (e.g., infrared radiation) which span the injection chamber. The relationship of the energy beams and the injector is such that both beams will only be broken when the rodent is in proper position to be shot by the injector. Additional safety chambers are provided to prevent accidental injury to a human who places a hand in the injection chamber.

14 Claims, 13 Drawing Figures

RODENT CONTROL APPARATUS

BACKGROUND OF THE INVENTION

The present invention relates to rodent control apparatus, and more particularly to a trap for killing rodents such as rats by injection of a spear into the rodent after electronically detecting the rodent's presence.

Various rodent control devices (e.g., mousetraps) are well known in the art. Many prior art devices are meant to be used one time and are not effective in the large scale control of undesirable rodents such as mice, rats, and the like. Other known control devices utilize deadly poisons in significant quantities which can adversely affect the environment and have devastating effects on humans, livestock, and pets.

It would be advantageous to provide a rodent control apparatus which is easy to set up and can be used on an ongoing basis to kill a multitude of rodents passing therethrough. Such an apparatus should provide adequate safety features to prevent harm to humans, livestock, pets, and the like. The present invention relates to such an apparatus.

SUMMARY OF THE INVENTION

In accordance with the present invention, rodent control apparatus is provided which comprises an injection chamber and means for detecting the presence of a rodent in the injection chamber. Upon detection of a rodent, a spear is injected into the rodent which leads to the rodent's death. Preferably, the rodent will not be killed immediately, but will be able to run out of the injection chamber to free the chamber up for its next victim.

The detection means can comprise means for projecting a beam of energy in the injection chamber together with means for producing a trigger signal to actuate the injecting means when the beam of energy is broken. For example, first and second emitters can project first and second spaced parallel energy beams across the injection chamber. A first detector mounted across the injection chamber from the first emitter can detect the first energy beam. A second detector mounted across the injection chamber from the second emitter can detect the second energy beam. Then a rodent is properly positioned in the injection chamber, both beams which normally travel from the emitters to the detectors will be broken. Means coupled to the first and second detectors can produce a trigger signal upon the simultaneous failure of the first and second detectors to detect the first and second energy beams, respectively. The trigger signal can actuate a solenoid arrangement which shoots a spear between the first and second energy beams, whereby a rodent entering the injection chamber and breaking the beams will be injected with a spear.

The spear injecting means can comprise a solenoid with a plunger that extends upon actuation thereof. Means are provided for registering a spear along the longitudinal axis of the plunger for injection, upon actuation of the solenoid, into a rodent positioned in front of the spear. The spear injecting arrangement is mounted between the first and second energy beams so that a rodent breaking both beams will be in proper position for injection of the spear.

The present invention also provides a safety chamber for use with the rodent control apparatus. The safety chamber is mounted at the entry opening of the injection chamber such that the safety chamber must be passed through to gain entry to the injection chamber. An energy beam is projected across the safety chamber and, when the beam is broken, the spear shooting means is disabled. Thus, if a child were to place his hand through the safety chamber and into the injection chamber, there is no possibility that a spear would be injected into the child's hand, since the child's arm would break the beam in the safety chamber. If the injection chamber has more than one opening, each can be protected with a separate safety chamber.

The injection chamber can be provided with a slot for receipt of a cartridge containing a plurality of spears. Means for aligning the cartridge are provided to maintain successive spears in proper alignment with the spear shooting means such that a new spear from the cartridge will be shot each time a new rodent enters the injection chamber.

The energy beams used for the injection chamber and safety chambers can comprise infrared radiation. The beams can be generated by infrared emitters and detected by infrared detectors.

The present invention also provides a spear for use in a rodent control apparatus. The spear comprises a pointed hollow tube, a blood absorbing material filling the hollow tube, and a plurality of openings in the wall of the tube to provide a conduit for blood absorbed from outside the tube by the absorbing material. The spear can further comprise a coating of poison. Additionally, a marker thread which can have a bright color can be attached to the spear to facilitate the location of rodents which have died after being speared and leaving the injection chamber.

DETAILED DESCRIPTION OF THE INVENTION

Figure 1:
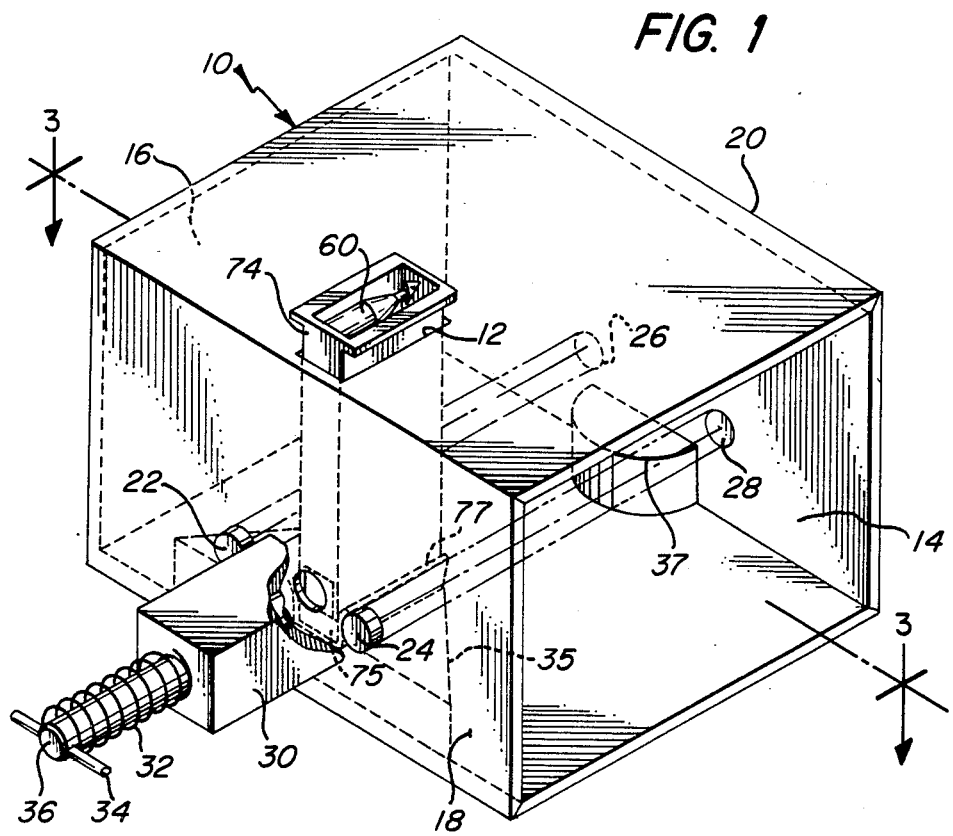
FIG. 1 is a perspective view of an injection chamber in accordance with the present invention.

The present apparatus is composed of an injection chamber generally designated 10 in FIG. 1 which can be adapted for use in the home, outside the home in areas where rubbish is stored, and in uncovered regions such as farms and fields.

Figure 2A:
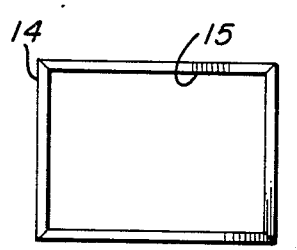
FIGS. 2A, 2B, and 2C schematically show alternate embodiments of entry and exit openings which can be provided on the injection chamber.
Figure 2B:
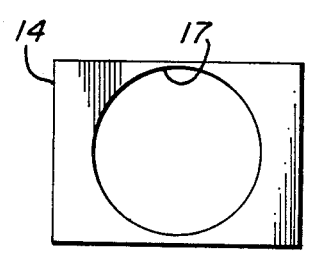
Figure 2C:
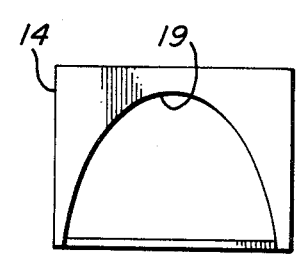

Injection chamber 10 is a generally rectangular box having an entry side 14, an exit side 16, front wall 18 and rear wall 20. Side walls 14 and 16 are generally open but the openings can take various shapes. For example, as shown in FIG. 2A opening 15 of side wall 14 is rectangular. As shown in FIG. 2B, a circular opening 17 can alternately be provided. FIG. 2C depicts a semicircular opening 19 which can be provided in side wall 14.

Injection chamber 10 is of a size which will accommodate the particular type of rodent to be controlled. The object is to entice the rodent into the injection chamber in the direction of the arrow shown in FIG. 3 so that it breaks a pair of parallel beams of energy (e.g., infrared radiation) 40, 42. Centered between the beams of radiation 40, 42 is a spear injection apparatus which, when the rodent is properly positioned to break both beams 40, 42, injects a deadly spear into the rodent. Injection chamber 10 can be made of any suitable material well known in the art, such as wood, plastic, or fiberglass.

Figure 8:
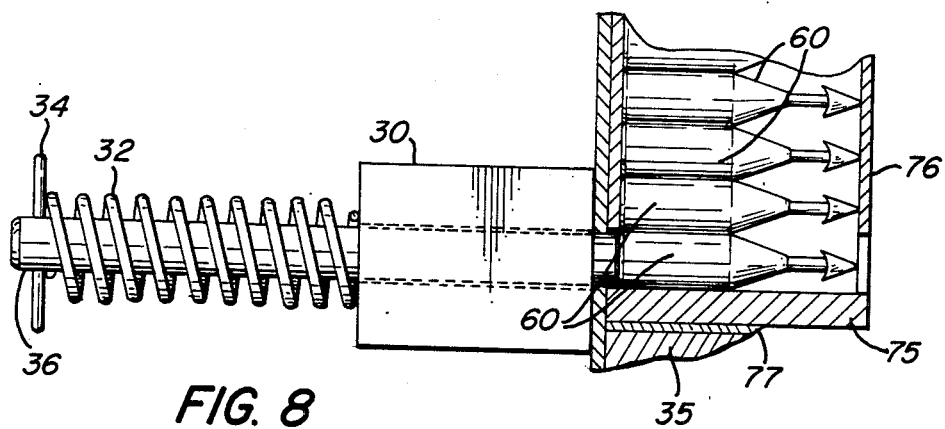
FIG. 8 is a diagrammatic view showing a spear in alignment with the injection solenoid.
Figure 9:
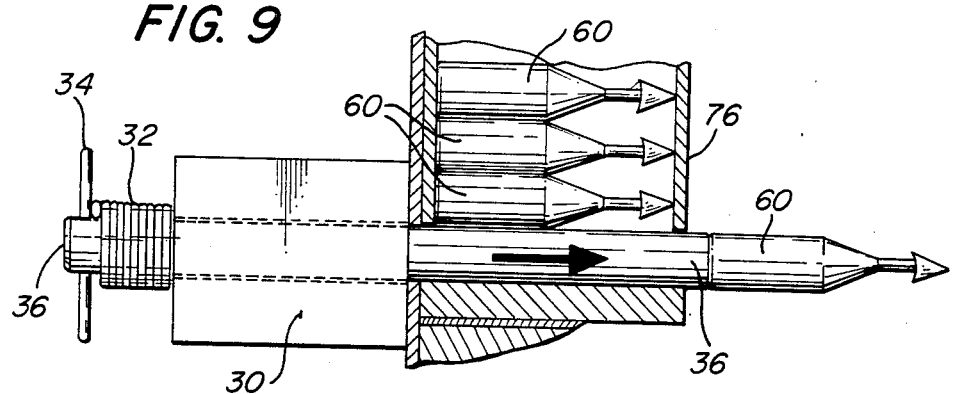
FIG. 9 is a diagrammatic view showing the aligned spear of FIG. 8 during injection.

The spear injection apparatus comprises a solenoid 30 which has a plunger 36 slidably extending therefrom. Plunger 36 is normally maintained in a retracted position by the action of return spring 32 sandwiched along the rear end of the plunger between the casing of solenoid 30 and a pin 34 attached at the rear end of plunger 36. When solenoid 30 is energized, plunger 36 will shoot forward into injection chamber 10, and will inject or shoot a spear in alignment therewith into a rodent positioned directly in front of the spear. FIG. 8 shows the solenoid 30 and a spear 60 in registration with plunger 36 prior to injection of the spear. FIG. 9 shows the solenoid 30 upon actuation by a suitable electric current as well known in the art, which causes the plunger 36 to be driven forward thereby driving spear 60 forward into the injection chamber and into a rodent (not shown) positioned in front of the spear.

Figure 6:
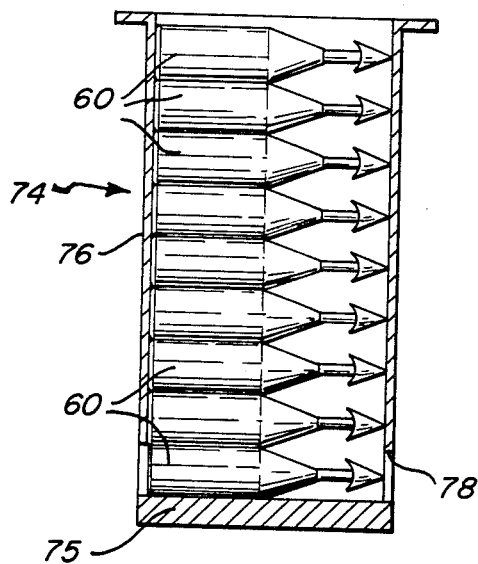
FIG. 6 is a cross-sectional view of a cartridge containing a plurality of spears.
Figure 7:
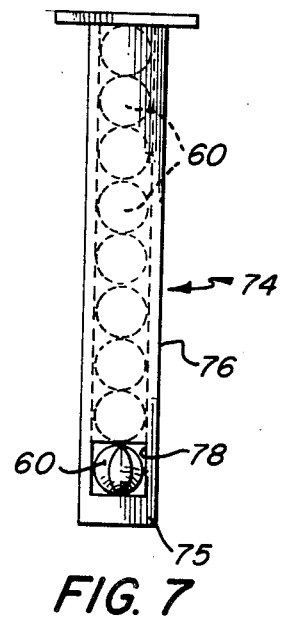
FIG. 7 is an end view of the cartridge shown in FIG. 6.

The spear 60 is provided in a cartridge of spears 74 shown in FIGS. 6 and 7. Cartridge 74 includes a housing 76 which is filled with a plurality of spears 60. An opening 78 is provided at the bottom of the cartridge assembly which enables solenoid plunger 36 to push successive gravity-fed spears 60 out of the cartridge. Spear cartridge 74 is inserted into injection chamber 10 through a slot 12 (see FIG. 1). A mounting base 75 of cartridge 74 fits into a corresponding mounting receptacle 77 provided in injection chamber 10. Slot 12 and mounting receptacle 77 are arranged in injection chamber 10 such that a cartridge inserted in slot 12 and mounted in receptacle 77 will place gravity-fed spears 60 in proper alignment with solenoid plunger 36.

Each spear 60 contains a pointed head 62, and a neck portion 64 which is coupled to main body portion 68 via taper 66. The spear is generally a hollow tube which is filled with a well known blood absorbing material or fibers 72. Openings 70 are provided in the wall of the hollow tube forming spear 60 to provide a conduit for blood absorbed from outside the tube by the absorbing material 72. To increase the killing strength of the spear, a coating of a suitable poison can be placed thereon. A marker thread 69 is attached to the body of spear 60. Marker thread 69 is preferably of a bright color, and serves to facilitate the location of a rodent injected with a spear after the rodent has exited the injection chamber.

Detection of a rodent inside injection chamber 10 is accomplished by detecting when energy beams 40 and 42 are simultaneously broken. Energy beam 40 is emitted by an emitter 22 and detected by a detector 26. Emitter 22 and detector 26 can be an infrared emitter-detector pair well known in the art. Similarly, energy beam 42 is emitted by an emitter 24 and detected by detector 28 which can be well known infrared emitter and detector devices.

Figure 3:
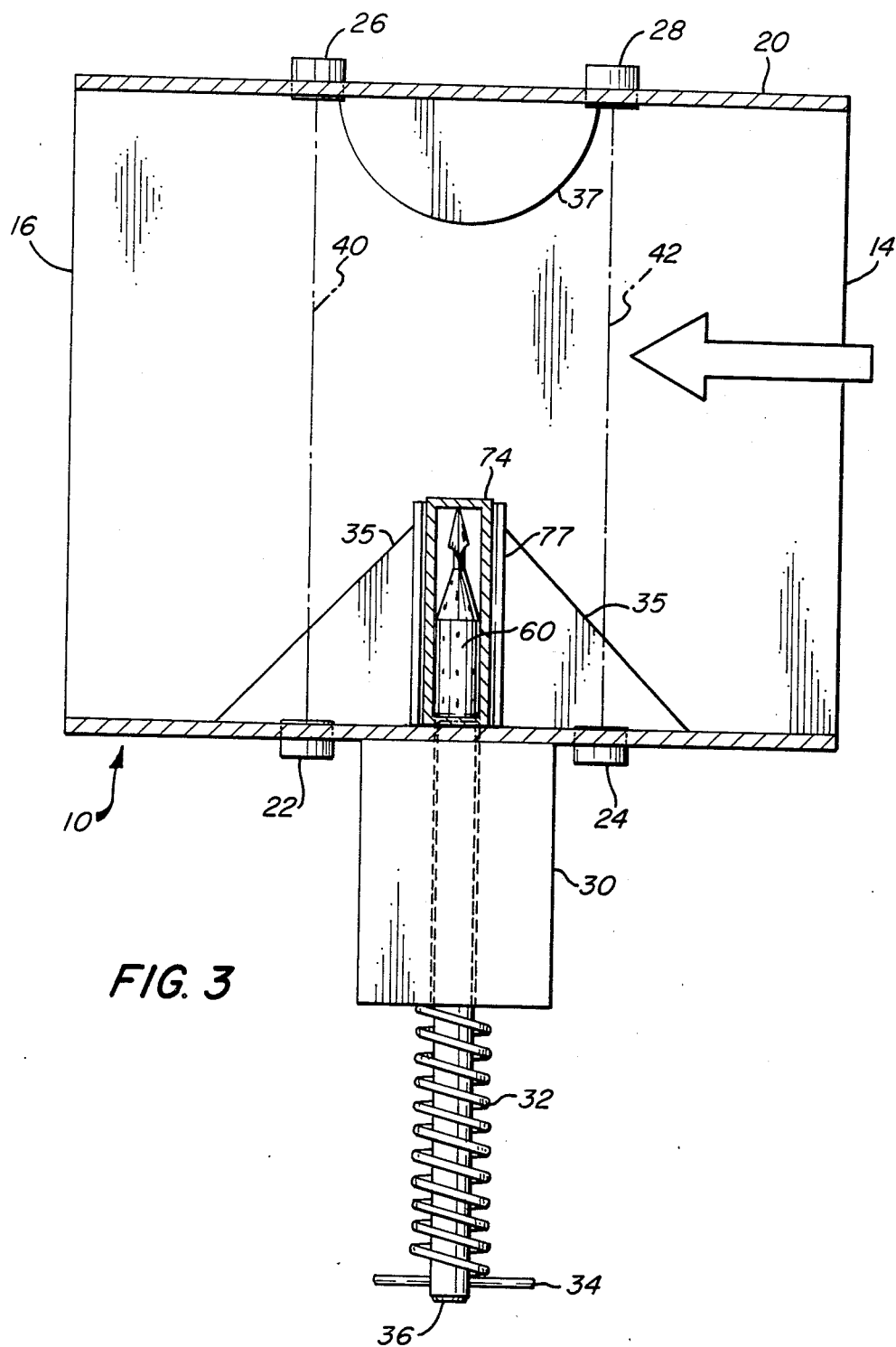
FIG. 3 is a top cross-sectional view taken along the lines 3—3 shown in FIG. 1.
Figure 10:
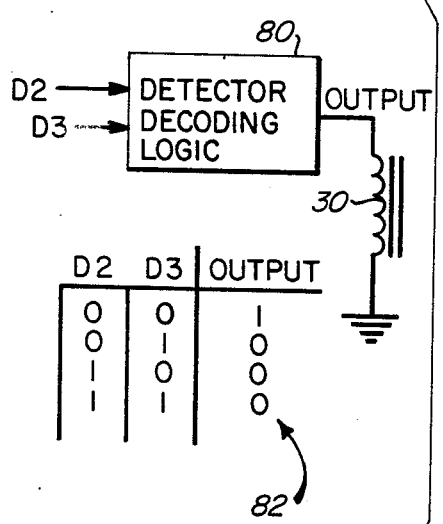
FIG. 10 is a block diagram showing the control circuitry for the solenoid when the injection chamber is used without the safety chambers shown in FIG. 4.

When a rodent enters injection chamber 10 via entry side 14, it is guided by baffles 35 extending from front wall 18 and baffle 37 extending from rear wall 20 to the space between parallel beams 40, 42 (see FIG. 3). Control circuitry shown in FIG. 10 detects when both beams 40 and 42 are broken. Detector decoding logic 80 is provided to detect when both detectors 26 and 28 no longer receive the energy emitted from emitters 22 and 24. Upon detection of this event, the output of detector decoding logic 80 will go high (or turn on) to actuate solenoid 30 which is connected thereto. A truth table 82 for detector decoding logic 80 is provided in FIG. 10. As shown, the output of detector decoding logic 80 will only be high when the outputs of detector 26 ("D2") and detector 28 ("D3") are low. If either or both of detectors 26, 28 are receiving energy from their associated emitters 22, 24 respectively, the output of detector decoding logic will be low and solenoid 30 will not be actuated. This structure ensures that a rodent will be properly positioned with respect to solenoid plunger 36 and a spear 60 longitudinally aligned therewith before solenoid 30 is actuated to inject the spear into the rodent. As shown in the figures, the spear injecting assembly is centrally located between energy beams 40, 42.

Figure 4:
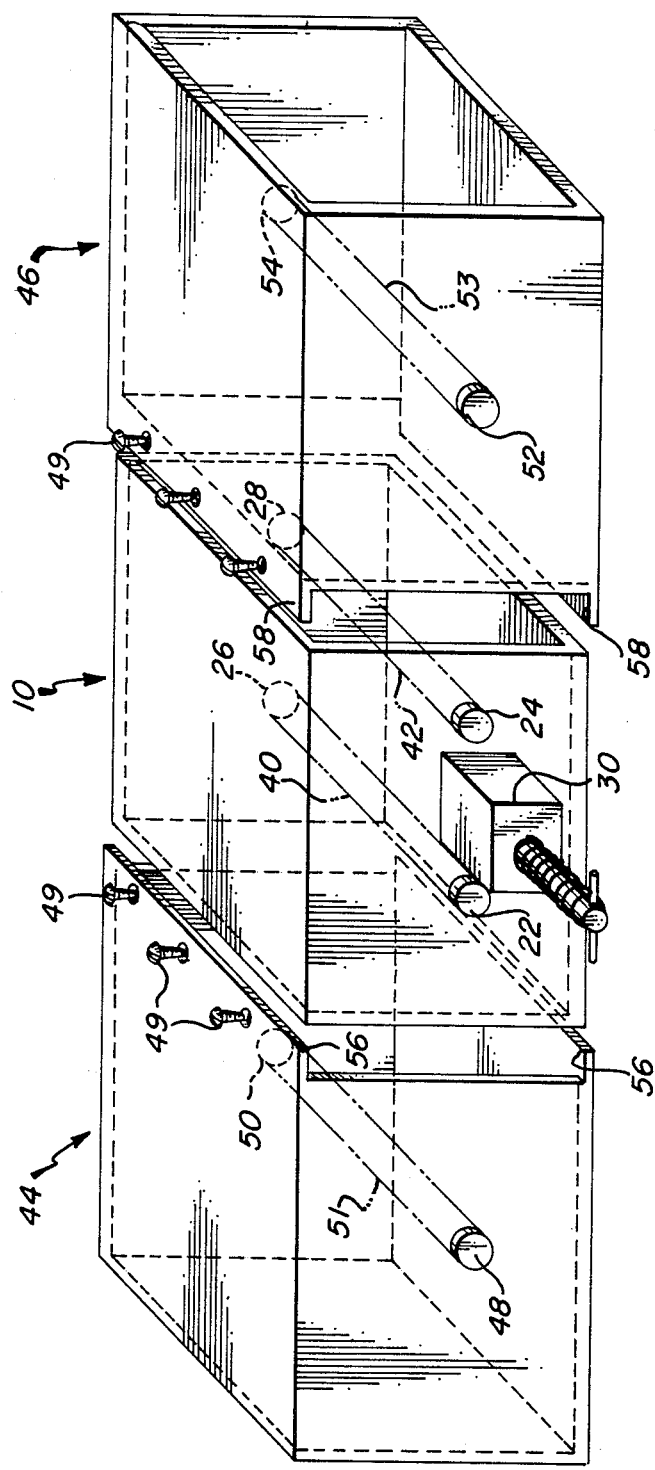
FIG. 4 is a perspective view showing an injection chamber with safety chambers at the entry and exit thereof.
Figure 5:
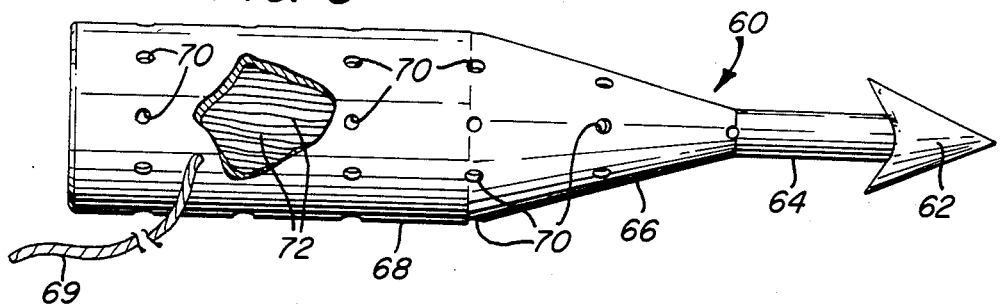
FIG. 5 is a plan view of a spear used in the rodent control apparatus with a cutaway view showing blood absorbing fibers inside the spear.

When the device of the present invention is used in the home, additional safety chambers 44, 46 are mounted to injection chamber 10 (FIG. 4). In this configuration, the only entrance to injection chamber 10 will be through one of safety chambers 44, 46. The safety chambers can be mounted to injection chamber 10 using screws 49 which attach lips 56 of safety chamber 44 to injection chamber 10. A similar arrangement can be used to secure safety chamber 46 to injection chamber 10 using screws which pass through lips 58.

Safety chamber 44 is provided with an energy emitter 48 and detector 50 which can operate in the same manner as the detectors and emitters in injection chamber 10. Detector 48 will send a beam 51 toward detector 50 for detection. If beam 51 is broken, solenoid 30 will be disabled so that it cannot shoot a spear. Likewise, safety chamber 46 includes an emitter 52 and detector 54. Emitter 52 projects a beam 53 toward detector 54. If beam 53 is broken, solenoid 30 is disabled.

Figure 11:
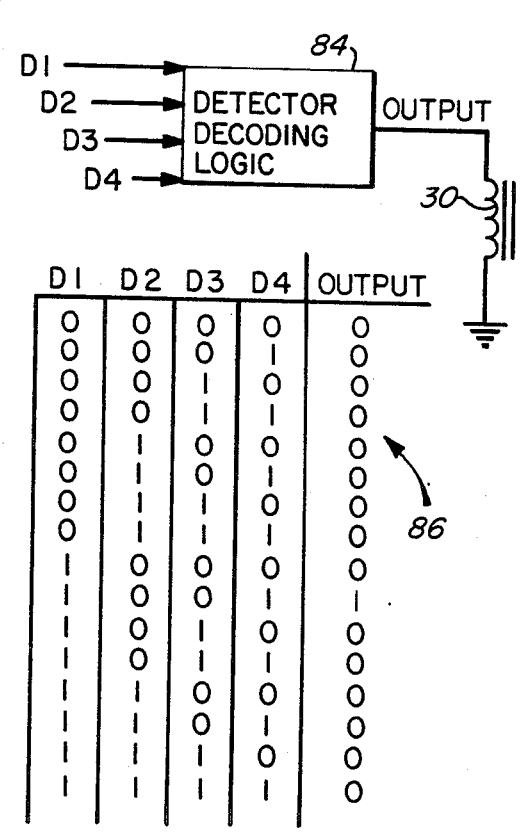
FIG. 11 is a block diagram of the injection control circuitry when the injection chamber is used in combination with the safety chambers shown in FIG. 4.

Control logic for disabling solenoid 30 when either beam 51 or 53 is broken is shown in FIG. 11. Detector decoding logic 84 receives as inputs the outputs from each of detectors 50 ("D1"), 26 ("D2"), 28 ("D3"), and 54 ("D4"). The output of detector decoding logic 84 is coupled to actuate solenoid 30 when high. As shown in the truth table 86 for decoding logic 84, the output of the logic will be high only when detectors 50 and 54 are receiving the energy emitted by their respective emitters, and when detectors 26 and 28 are not receiving the energy transmitted from their respective emitters. In other words, in order for a spear to be injected by solenoid plunger 36, beams 51 and 53 must be intact and beams 40 and 42 must be broken. This arrangement will prevent a spear from being injected into a person's hand is passed into injection chamber 10. Although the hand may break both beams 40 and 42, the person's arm will also break either beam 53 or 51 in the process. Since beam 51 or 53 is broken, solenoid 30 will not fire.

In other locations, injection chamber 10 can be used without safety chambers 44 and 46. For example, injection chamber 10 can be used by itself outside of the home in garbage sheds where there is no possibility that a human may try to place its hand into the chamber. The injection chamber can be built into a rubbish shed or the like in a location inaccessible to a human hand.

Injection chamber 10 could alternately be placed in a farmer's field to kill rodents which frequent certain paths. An arrangement of baffles can be used to block off the direct path normally used by rodents and thereby guide the rodents into injection chamber 10. Once in injection chamber 10, the rodent will be speared and ultimately killed.

The electronic control circuitry for solenoid 30 and the solenoid itself can be operated from a power supply which runs off of house current (e.g., 110 or 120 volts). Alternately, the electronic circuitry and solenoid can be driven from a solar power source (e.g. solar cells) which power source is particularly advantageous when the device is used outdoors.

When using the apparatus in the home it is preferably located parallel to a wall along which rodents generally travel. Rodents can be tempted to pass through the apparatus through the use of bait such as bread or sweets. Outside the home, injection chamber 10 can be placed adjacent the holes or known paths of rodents. Where it is desired to control rodents where garbage is stored, injection chamber 10 can be located so that the only access for a rodent to the garbage is through the injection chamber.

It will now be appreciated that the present invention provides an apparatus for the control of rodents such as rats which guarantees safety, cleanliness, and is easy to use. The device ensures the destruction of a great number of rodents with low expense.

Various modifications and adaptations of the present invention will be apparent to those skilled in the art. It is intended to cover all such variations and modifications which are within the spirit and scope of the appended claims.

I claim:

1. Rodent control apparatus comprising:
an injection chamber;
means for detecting the presence of a rodent in said injection chamber;
means for injecting a spear into a rodent upon detection of the rodent by said detection means;
a slot in said injection chamber; a cartridge containing a plurality of spears for receipt in said slot; and means for aligning said cartridge when passed through said slot with said spear shooting means such that a new spear from the cartridge will be shot each time a rodent is detected by said detection means.

2. The apparatus of claim 1 wherein said detection means comprises:
means for projecting a beam of energy in said injection chamber; and
means for producing a trigger signal to actuate said injecting means when said beam is broken.

3. The apparatus of claim 2 wherein said spear injecting means comprises:
a solenoid having a plunger which extends upon actuation of the solenoid;
means for registering a spear along the longitudinal axis of said plunger for injection into a rodent positioned in front of the spear upon actuation of said solenoid; and
means for coupling said solenoid for actuation by said trigger signal.

4. The apparatus of claim 3 wherein said detection means projects two parallel beams of energy with the longitudinal axis of said plunger therebetween, and said trigger signal is produced only when both beams are simultaneously broken, whereby a rodent must be positioned along the plunger axis and in the firing line of a spear in order to break both beams and thereby cause the solenoid to be actuated.

5. Rodent control apparatus comprising:
an injection chamber having an opening for the entry of a rodent;
first and second emitters for projecting first and second spaced parallel energy beams across said injection chamber;
a first detector mounted across said injection chamber from said first emitter for detecting the first energy beam;
a second detector mounted across said injection chamber from said second emitter for detecting the second energy beam;
means coupled to said first and second detectors for producing a trigger signal upon the simultaneous failure of said first and second detectors to detect the first and second energy beams, respectively;
means responsive to said trigger signal for shooting a spear between said first and second energy beams;
a slot in said injection chamber; a cartridge containing a plurality of spears for receipt in said slot; and means for aligning said cartridge when passed through said slot with said spear shooting means such that a new spear from the cartridge will be shot each time the first and second beams are simultaneously broken;
whereby a rodent entering said injection chamber and breaking said beams will be injected with a spear.

6. The apparatus of claim 5 further comprising:
a safety chamber;
means for mounting said safety chamber at the entry opening of said injection chamber such that the safety chamber must be passed through to gain entry to the injection chamber;
a third emitter for projecting a third energy beam across said safety chamber;
a third detector mounted across said safety chamber from said third emitter for detecting the third energy beam; and
means responsive to said third detector for disabling said spear shooting means if the path of the third energy beam to the third detector is broken.

7. The apparatus of claim 6 wherein said injection chamber comprises an additional opening for the exit of a rodent, said apparatus further comprising a second safety chamber mounted to the exit opening of the injection chamber, said second safety chamber including:
a fourth emitter for projecting a fourth energy beam across said second safety chamber,
a fourth detector mounted across said second safety chamber from said fourth emitter for detecting the fourth emergy beam, and means responsive to said fourth detector for disabling said spear shooting means if the path of the fourth energy beam to the fourth detector is broken.

8. The apparatus of claim 5 wherein said energy beams comprise infrared radiation.

9. The apparatus of claim 5 wherein said spear shooting means comprises:
- a solenoid having a plunger which extends upon actuation of the solenoid;
- means for registering a spear along the longitudinal axis of said plunger; and
- means for coupling said solenoid for actuation by said trigger signal.

10. The apparatus of claim 5 further comprising baffle means mounted in said injection chamber to guide a rodent to break said first and second beams.

11. A spear in combination with a rodent control apparatus having an injection chamber, means for detecting the presence of a rodent in said injection chamber, and means for injecting said spear into a rodent upon detection thereof, said spear comprising:
- a pointed hollow tube;
- a blood absorbing material filling said hollow tube; and
- a plurality of openings in the wall of said tube to provide a conduit for blood absorbed from outside the tube by the absorbing material.

12. The combination of claim 11 wherein said spear further comprises a coating of poison.

13. The combination of claim 11 wherein said spear further comprises a marker thread extending from said tube.

14. The combination of claim 13 wherein said marker thread has a bright color.

* * * * *